United States Patent

Costa

[11] Patent Number: 5,828,625
[45] Date of Patent: Oct. 27, 1998

[54] ECHO SIMULATOR FOR ACTIVE SONAR

[75] Inventor: David R. Costa, Taunton, Mass.

[73] Assignee: The United States of America as represented by the Secretary of the Navy, Washington, D.C.

[21] Appl. No.: 954,884

[22] Filed: Oct. 9, 1997

[51] Int. Cl.[6] .................................................. H04B 17/00
[52] U.S. Cl. .......................................................... 367/13
[58] Field of Search .................................. 367/13; 434/6, 434/7

[56] References Cited

U.S. PATENT DOCUMENTS

| 4,250,634 | 2/1981 | Buckler | 367/13 |
| 4,908,800 | 3/1990 | Dilemmo | 367/13 |
| 4,972,379 | 11/1990 | Harris, Jr. | 367/13 |
| 4,972,381 | 11/1990 | Mitchell et al. | 367/13 |

Primary Examiner—Daniel T. Pihulic
Attorney, Agent, or Firm—Michael J. McGowan; Robert W. Gauthier; Prithvi C. Lall

[57] ABSTRACT

A target echo simulator with reverberation and ambient noise for testing an active sonar system. A transmit enable pulse from a sonar transmitter establishes a sequence of operations in which a target echo generator, reverberation generator and ambient noise generator produce a composite signal. The target echo generator produces a pulse modulated output pulse of a characteristic sonar frequency. The reverberation generator produces an amplitude modulating or envelope controlled output at a frequency of a carrier that is offset from the target echo carrier frequency. An ambient noise generator constantly produces ambient noise. A summing amplifier combines the generated signals to produce a composite signal for transfer to a receive connection on the active sonar system.

14 Claims, 4 Drawing Sheets

AMBIENT NOISE

OUTPUT

ECHO SIMULATOR FOR ACTIVE SONAR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to simulators for testing electronic equipment and more particularly to a simulator for facilitating the testing of an active sonar receiver.

(2) Description of the Prior Art

Sonar devices are classified as active or passive devices. Passive devices merely "listen" to sounds in the environment. Active sonars transmit a pulse and listen for the returning echo. This invention is particularly adapted for such active sonar systems.

After an active sonar system transmits a sonar pulse, it waits for an echo. An echo takes time to travel through the water and sonar systems use this round trip time to estimate target range. The target echo can become elongated due to multiple reflections occurring along the horizontal axis of the target. At the end of the transmit pulse, a phenomenon called a reverberation also occurs due to surface reflections, scattering and multiple paths. The energy due to reverberation rises quickly and then decays slowly. The sonar receivers also receive ambient noise caused by the underwater environment.

An existing practice for testing the receiving portions of active sonar systems is to place the sonar system in a water filled testing tank. Various devices associated with the tank then simulate different types of signals. Such signals can be generated by devices as described in U.S. Pat. No. 4,908,800 (1990) to DiLemmo; U.S. Pat. No. 4,972,379 (1990) to Harris, Jr.; and U.S. Pat. No. 4,972,381 (1990) to Mitchell et al.

The Dilemmo patent discloses the simulation of a plurality of hydrophone output signals representative of an ocean bottom for testing a receiver. The phase shift of the output of each hydrophone at each snapshot is determined along with amplitude. This information is stored for use during simulation. During the simulation a carrier signal and recorded phase shift amplitude information are applied to a phase shifter to phase shift the carrier signal in accordance with the recorded phase shift data for each channel and to attenuate the phase shifted signal. The phase shifted and attenuated output is applied to a channel of a sonar receiver. Two phase shift words representative of the phase shift of the hydrophone can modulate a master and a delayed master respectively to provide better results. The phase shift data may be selectively applied to the receiver of the sonar sounding system to test the receiver at a plurality of different resolutions.

In accordance with the Harris, Jr. patent a sonic echo simulator for simulating sonar signals reflected from underwater targets has a transmitter that broadcasts sonar signals through a given amount of water toward a receiver for readout thereby. Prior to broadcast, various characteristics, such as target length, target aspect, target shadow length, range to sea floor, sea floor reverberation and target highlights are selectively incorporated into the broadcast sonar signals by the combined circuits for the timely generation thereof, respectively.

The Mitchell et al. patent discloses a test apparatus for a sonar that utilizes beamformer circuitry. This enables a quantitative test of the signal channels of the sonar system, including the transducers themselves. The test is conducted automatically and in situ utilizing the beamformer circuitry of the sonar system itself.

Other approaches have been taken for generating sonar signals of various types for purposes of training sonar operators. These include U.S. Pat. No. 2,522,541 (1950) to Saxton et al.; U.S. Pat. No. 3,092,684 (1963) to Frankel; U.S. Pat. No. 3,311,868 (1967) to Cupp et al.; and U.S. Pat. No. 3,936,958 (1976) to Clapsaddle.

The Saxton et al. patent discloses a ship board sound operator trainer that responds to the receipt of a pulse and that enables an instructor to control certain characteristics of the pulse. The Frankel patent discloses a system that injects random noise into a signal used for training. The Cupp et al. patent also discloses a noise generator for simulating cavitation noises. These signals are combined with another signal representing machinery noises. The Clapsaddle patent discloses a simulator for sonar reverberation signals.

None of these references discloses any structure that would enable bench testing. Yet, as known, bench testing, outside the water, would facilitate access to specific receiver areas and consequently enable easier and more thorough testing. This would be particularly true if a simulator were available that could provide a signal representing the combination of a target echo, signal reverberation signal and noise under various controls. None of the foregoing references provides that type of composite signal for testing or training. Thus, none of them are readily adapted for bench testing sonar systems, particularly active sonar systems. Moreover many of the prior art systems are very complex and would, even if incorporated in such a simulator, increase the overall cost of the simulator. Consequently and notwithstanding the disclosures in the above-identified patents, the preferred method of testing active sonar systems is to test them in a tank with the attended costs of such a tank.

SUMMARY OF THE INVENTION

Therefore it is an object of this invention to provide a simulator for the receiver of an active sonar system.

Another object of this invention is to provide a simulator for energizing an active sonar system receiver that enables bench testing.

Still another object of this invention is to provide a simulator for testing an active sonar system receiver with a composite signal incorporating target echo, reverberation and ambient noise signals.

Still another object of this invention is to provide a simulator for an active sonar system receiver that provides a composite signal including a target echo, reverberation and noise signals in which controls exist for each of the component signals.

A target echo simulator for testing sonar receivers in accordance with this invention includes a target echo signal generator, a reverberation signal generator and an ambient noise generator. A control connects to each of the generators to determine the characteristics of the target echo and reverberation signals. A summing circuit combines the signals from each of the generators to produce a composite signal for testing the receiver.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
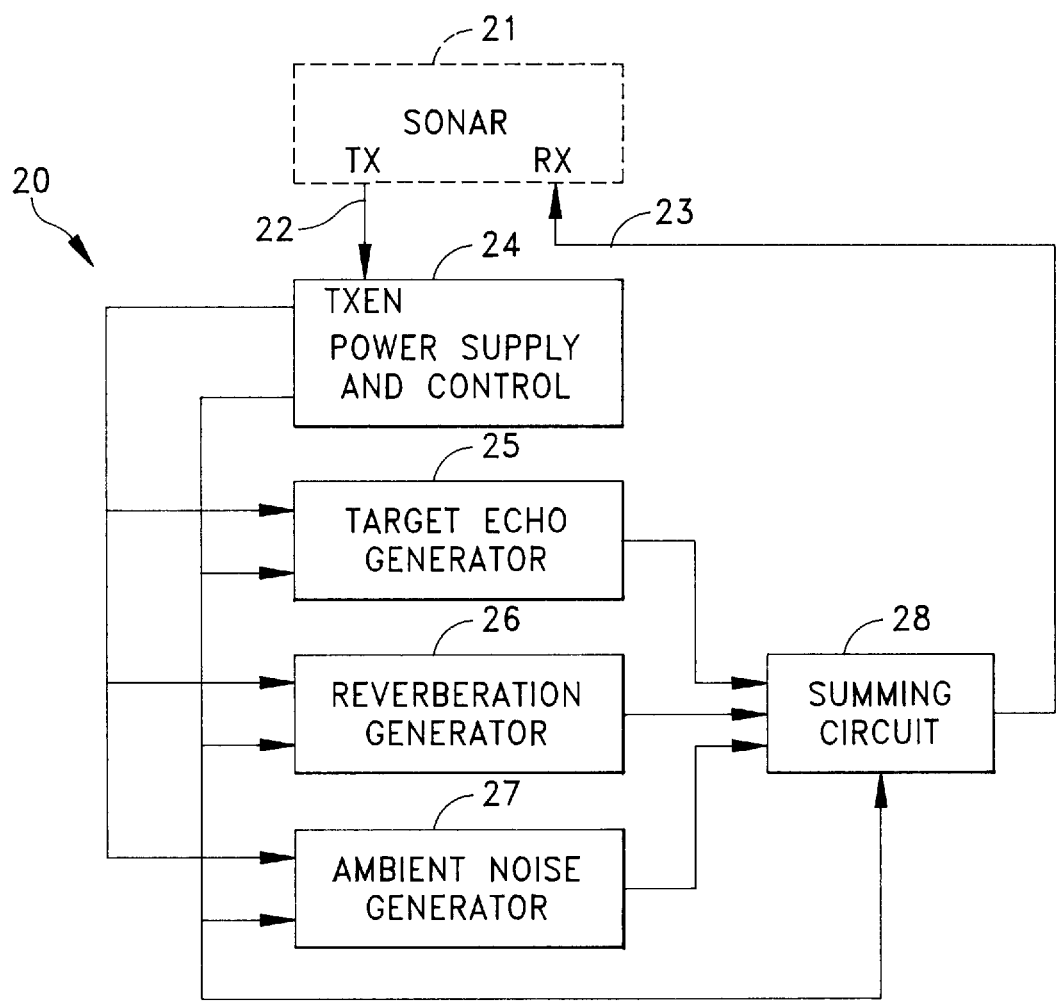
FIG. 1 is a block diagram of a sonar simulator constructed in accordance with this invention.

FIG. 1 depicts an active sonar simulator 20 constructed in accordance with this invention that connects to an active sonar system 21. The active sonar system 21 generates a transmit enabling pulse TXEN to the simulator 20 at a TX connection 22 and receives input signals from the simulator 20 at an RX connection 23.

Within the simulator 20, a power supply and control circuit 24 receives the pulse from the TX connection 22 and controls the operation of a target echo generator 25, reverberation generator 26 and ambient noise generator 27. A summing amplifier 28 receives the outputs of each of the generators 25, 26 and 27 to produce a composite signal for transfer to the sonar 21 through the RX connection 23. More specifically, the control 24 establishes the timing and duration of the signals from the target echo generator 25 and reverberation generator 26.

Figure 2:
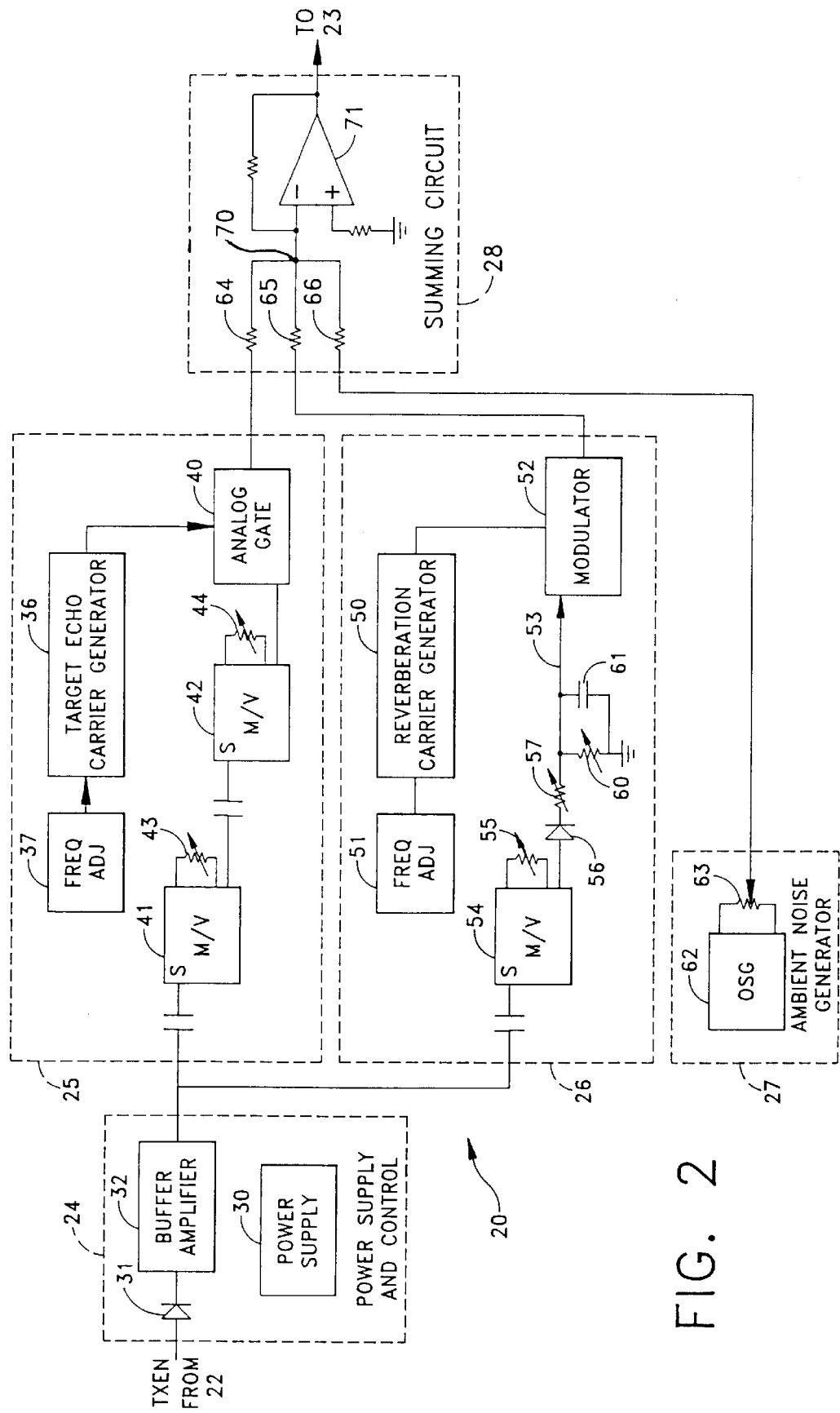
FIG. 2 is a detailed block diagram of a sonar simulator in FIG. 1.

Referring now to FIG. 2, the power supply and control circuit 24 comprises a power supply 30 for energizing the remaining circuit components in the simulator 20. Such power supplies are well known in the art and no further description of the power supply or its connection to the various components is necessary.

Figure 3:
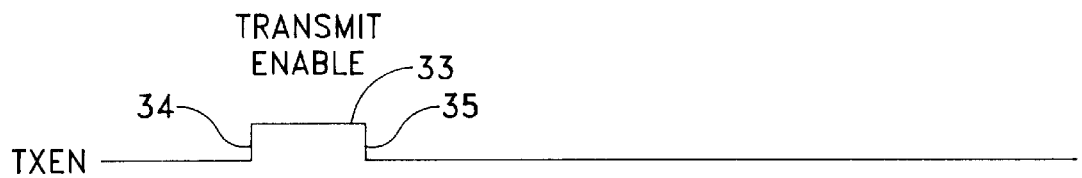
FIGS. 3 through 10 are graphs of various signals generated in the simulator of FIGS. 1 and 2.

Whenever the sonar transmitter produces the TXEN pulse at the TX connection 22, it appears at the input to a circuit comprising an input diode 31 that limits the signal magnitude and a buffer amplifier 32. The output from the buffer amplifier is, as shown in FIG. 3, a constant height, constant width transmit enable pulse 33 having a leading edge 34 and a trailing edge 35.

Referring to FIG. 2, the target echo generator 25 includes a target echo carrier signal generator 36 that is typically a sinusoidal frequency generator. Normally there will be a frequency adjustment shown as the FREQ ADJ circuit 37 to enable the selection of a signal frequency corresponding to the nominal operating frequency of the sonar system. For a given test the target echo carrier signal generator 36 will produce a frequency that is constant over the time. This fixed frequency signal is applied to the input of an analog gate 40. Conductivity through the analog gate 40 is controlled by a timing circuit comprising a first conventional multi-vibrator 41 and a second conventional multi-vibrator 42 connected in series. When the target echo generator 25 is energized at the input by pulse 33, each of the multi-vibrators 41 and 42 produces an output pulse. Variable resistors 43 and 44 establish the duration of the pulses from the multi-vibrators 41 and 42 respectively. In this particular application the multi-vibrators operate as one-shot multi-vibrators.

Figure 4:
Figure 5:
Figure 6:
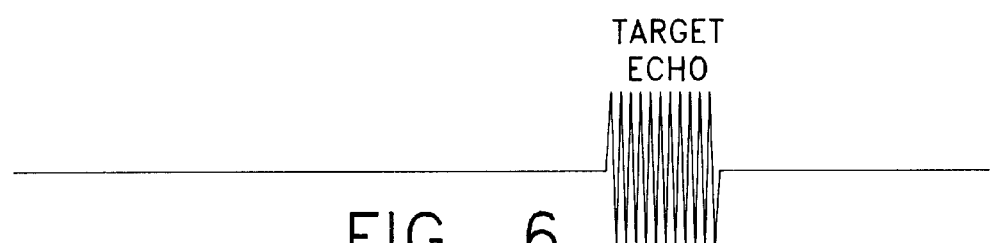

More specifically, the trailing edge 35 triggers the one-shot multi-vibrator 41 to produce a roundtrip time pulse 38 shown in FIG. 4 having a duration established by the variable resistor 43. The trailing edge 39 of the roundtrip time pulse 38 in FIG. 4 activates the one-shot multi-vibrator 42 to produce a pulse duration pulse as shown in FIG. 5, the variable resistor 44 controlling the width of this pulse. The pulse in FIG. 5 is an enabling pulse to the analog gate 40. That is, while the pulse is in an active or asserted state, the analog gate 40 conveys the carrier signal from the target echo carrier generator 36 to the summing generator 28 as a pulse of the sinusoidal signal, shown as the pulse of FIG. 6.

Referring again to FIG. 2, the reverberation signal generator 26 includes a reverberation carrier generator 50 that also produces an AC signal, typically a sinusoidal signal, that is established by a frequency adjustment (FREQ ADJ) circuit 51. Like the target echo carrier generator 36, the reverberation carrier of generator 50 produces a constant frequency signal during the duration of any test. However to establish a reverberation effect the frequency of the reverberation carrier generator 50 will be offset from that of the target echo generator by some predetermined amount. As an example, at a 20 kHz nominal frequency for the target echo carrier generator 36, the reverberation carrier generator 50 might be set to 18 kHz.

A modulator 52 in the reverberation signal generator 26 receives this carrier. An envelope signal appears on a conductor 53 to control the modulator 52. This envelope signal is also generated in response to the TXEN pulse. More specifically, the trailing edge 35 of the TXEN pulse energizes a one-shot multi-vibrator 54 that produces a pulse having a duration established by a variable resistor 55. As will become more apparent, this variable resistor 55 establishes the interval during which the reverberation signal will rise. When the one-shot multi-vibrator 54 is active, a diode 56 conveys the output through a charging path comprising a variable resistor 57 that is in series between the diode 56 and a parallel circuit comprising the input to the modulator 52, a variable resistor 60 and a capacitor 61. Thus, while the one-shot multi-vibrator 54 is active, the capacitor 61 charges through the variable resistor 57 and the value of the variable resistor 57 will establish the slope or the RC timing constant by which the voltage on the capacitor 61 rises.

Figure 7:
Figure 8:
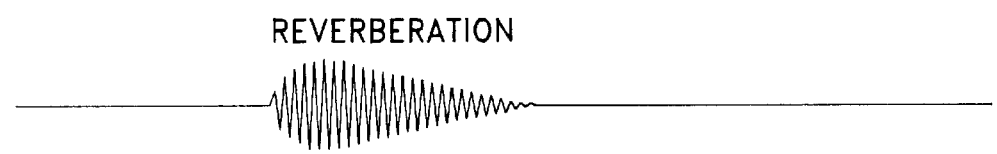

At the end of the rise time interval established by the one-shot multi-vibrator 54, the diode becomes non-conducting and the capacitor 61 must discharge through the resistor 60. This establishes the RC time constant for the slope or the fall of the signal while the capacitor 61 discharges. If the value of the variable resistor 60 is large in comparison to the value of the resistor 57, the variable resistors 57 and 60 act to establish independent controls over the characteristic rise and fall times of the envelope signal on the conductor 53. The result is an envelope signal on the conductor 53 having a shape that is represented in FIG. 7. When this reverberation envelope signal is applied over the conductor 53, the modulator 52 produces an output that corresponds to FIG. 8 which is a variable amplitude, constant frequency pulse in which the amplitude initially rises and then decays to zero.

Figure 9:
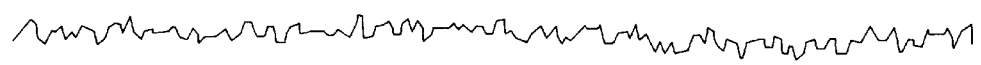
Figure 10:
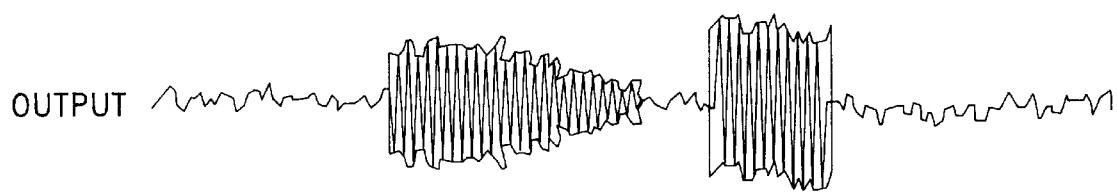

Referring again to FIG. 2, the ambient noise generator 27 comprises a conventional oscillator 62 that is constantly energized to generate a continuous noise signal. Any number of oscillators can be used to generate appropriate noise signals as are known in the art. The ambient noise generator 27 additionally produces this output across a variable output resistor 63 such that the amplitude of the ambient noise can be controlled. A typical ambient noise signal is depicted in FIG. 9.

Referring again to FIG. 2, the summing generator 28 includes three summing resistors 64, 65 and 66 connected from a summing junction 70 back to the analog gate 40, modulator 52 and variable resistor 63, respectively. Consequently the signal at the junction 70 is a composite signal incorporating the target echo of FIG. 6, the reverberation signal of FIG. 8 and the noise of FIG. 9. A conventional operational amplifier 71 couples this signal to the RX connection 23 of the sonar receiver 21.

As will now be apparent, the simulator in FIG. 2 is a simple circuit to construct. It provides a great deal of flexibility. The carrier frequencies from the carrier generators 36 and 50 can be adjusted or fixed. The timing of the target echo simulating the roundtrip time from the transmitter to a target and return is easily controlled by the variable resistor 43 and the duration of the target echo, that may be elongated in normal operations over the transmitting enable pulse, is controlled by an independent variable resistor 44. The nature of the reverberation signal can be controlled independently with respect to the interval during which the signal rises, the rate at which the signal rises and the subsequent rate at which the signal falls. When combined with the carrier from the reverberation carrier generator 50, the modulator 52 produces a signal that accurately represents typical reverberation. Likewise noise is constantly generated as would be seen in an actual environment and the level of the noise is adjusted by means of the variable resistor 63.

Therefore it now will be apparent that a simulator shown in FIGS. 1 and 2 that produces signals as shown by the examples in FIGS. 3 through 10 meets all the objectives of this invention. The simulator is easy to construct. It produces a composite signal which provides a good simulation of all the signals that are necessary to a sonar system receiver test. It is easily connected to the sonar system transmitter and receiver on a bench to facilitate testing of the receiver with ready access. There is no need for an aqueous environment as was true in the prior art. Further the structure while simple in construction provides sophisticated outputs with a number of very specific controls to further facilitate its use in a wide variety of testing environments with different sonar systems.

This invention has been disclosed in terms of specific circuit components particularly for each of the generators 25, 26 and 27 and the summing generator 28. It will be apparent that a number of variations could be incorporated. For example, FIG. 2 discloses separate frequency adjustment circuits 37 and 51.

Typically they would be incorporated as part of a commercially available sinusoid AC frequency signal generator that would constitute each of the carrier generators 36 and 50. With some limitation of flexibility, each of those generators could be constituted by a fixed frequency generator. The various controls have been shown as being provided by one-shot multi-vibrators controlling analog gates and modulators. Other approaches for generating the necessary pulses are also possible.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A target echo simulator for testing a sonar receiver in an active sonar system that includes a connection at which a transmit enable pulse appears, said simulator comprising:

first and second carrier generators for generating carrier signals at first and second frequencies, each of said carrier signal generators being continuously operable;

a target echo signal generator connected to said first carrier generator for generating a target echo signal;

a reverberation signal generator connected to said second carrier generator for generating a reverberation signal;

an ambient noise generator for generating ambient noise;

a control circuit for controlling the timing and duration of the signals from said target echo signal generator and said reverberation signal generator;

a summing circuit for combining the signals from each of said generators thereby to produce a composite signal for testing the sonar receiver;

a circuit within the control circuit responsive to the transmit enable pulse for activating said target echo and reverberation signal generators;

an envelope signal generator within said reverberation signal generator responsive to said activation circuit for generating an envelope signal over a defined period; and a modulator connected to said second carrier generator and said envelope signal generator for combining the signals therefrom.

2. A target echo simulator for testing the receiver section of an active sonar system, said simulator comprising:

a target echo signal generator for generating a target echo signal;

a reverberation signal generator for generating a reverberation signal;

an ambient noise generator for generating an ambient noise signal;

control means for controlling the timing and duration of the signals from said target echo signal generator and said reverberation signal generator, the sonar system generating a transmit pulse for each active pulse to be transmitted;

summing means for combining the signals from each of said generators thereby to produce a composite signal for testing the sonar receiver; and activation means within the control means responsive to the transmit enable signal for activating said target echo and reverberation signal generators.

3. A target echo simulator as recited in claim 2 wherein said target echo generator includes:

means for connection to a carrier generator;

gating means for selectively conveying the signal from the carrier generator to said summing means; and timing means responsive to being activated by said activation means for defining an interval during which said gating means conveys signals to said summing means.

4. A target echo simulator as recited in claim 3 wherein said timing means comprises:

a first delay circuit connected to said activation means for establishing a first delay interval; and a second delay circuit connected to said first delay circuit and said gating means for defining a second delay interval that follows the first interval and that enables said gating means to convey the carrier signal to said summing means as the target echo signal.

5. A target echo simulator as recited in claim 4 wherein each of said first and second delay circuits includes means for controlling the corresponding delay intervals independently.

6. A target echo simulator as recited in claim 2 wherein said reverberation generator comprises:

means for connection to a carrier generator;

envelope signal generating means responsive to said activation means for generating an envelope signal over a defined period; and means connected to said carrier generator and said envelope signal generating means for combining the signals therefrom to produce the reverberation signal.

7. A target echo simulator as recited in claim 6 wherein said envelope signal generating means includes:

a delay circuit for establishing an initial interval during which the envelope signal increases; and rise and fall time control means for controlling rise and fall characteristics for the envelope signal.

8. A target echo simulator as recited in claim 7 wherein said rise and fall characteristic control means includes first and second variable time control means for controlling the characteristics of the rise and fall of the envelope respectively and independently.

9. A target echo simulator as recited in claim 2 wherein said ambient noise generator comprises:

an oscillator circuit means for generating the ambient noise signal; and variable output means for controlling the level of the ambient noise signal conveyed to said summing means.

10. A target echo simulator as recited in claim 2 wherein said ambient noise generator comprises:

an oscillator for generating a continuous white noise signal; and a variable output resistor for controlling a level of the continuous white noise signal to produce the ambient noise signal.

11. A target echo simulator as recited in claim 1 wherein said envelope signal generator includes:

a delay circuit for establishing an interval during which an amplitude of the envelope signal will increase;

a capacitor;

a first resistor connected between said delay circuit and said capacitor for controlling characteristics of the amplitude increase while the delay circuit is active;

a second resistor in parallel with said capacitor for controlling a discharge of said capacitor and characteristics of a decrease in the amplitude of the envelope signal when the delay circuit is inactive.

12. A target echo simulator as recited in claim 11 wherein said first and second resistors are variable resistors.

13. A target echo simulator for testing a sonar receiver in an active sonar system that includes a connection at which a transmit enable pulse appears, said simulator comprising:

first and second carrier generators for generating carrier signals at first and second frequencies, each of said carrier signal generators being continuously operable;

a target echo signal generator connected to said first carrier generator for generating a target echo signal;

a reverberation signal generator connected to said second carrier generator for generating a reverberation signal;

an ambient noise generator for generating ambient noise;

a control circuit for controlling the timing and duration of the signals from said target echo signal generator and said reverberation signal generator;

a summing circuit for combining the signals from each of said generators thereby to produce a composite signal for testing the sonar receiver;

a circuit within the control circuit responsive to the transmit enable pulse for activating said target echo and reverberation signal generators;

an analog rate within said target echo signal generator connected between said first carrier generator and said summing means;

a timing circuit responsive to the transmit enable pulse for defining an interval during which said analog rate conveys the signal from said first carrier generator to said summing circuit;

a first delay circuit within said timing circuit connected to said activation circuit for establishing a first delay interval; and a second delay circuit within said timing circuit connected to said first delay circuit and said analog gate for defining a second delay interval that follows the first interval during which said analog gate conveys the target echo signal from said first carrier generator to said summing means as a first portion of said composite signal.

14. A target echo simulator as recited in claim 13 wherein each of said first and second delay circuits includes a variable resistor for controlling the corresponding delay intervals independently.

* * * * *